United States Patent [19]

Wagner

[11] 4,336,768
[45] Jun. 29, 1982

[54] ANIMAL SORTING GATE

[75] Inventor: Robert L. Wagner, Hampton, Iowa

[73] Assignee: Ram Handler, Ltd., Kesley, Iowa

[21] Appl. No.: 205,263

[22] Filed: Nov. 10, 1980

[51] Int. Cl.³ .............................................. A01K 29/00
[52] U.S. Cl. ..................................................... 119/155
[58] Field of Search ................................. 119/155, 100

[56] References Cited

U.S. PATENT DOCUMENTS

| 182,688 | 9/1876 | Minor | 119/155 |
|---|---|---|---|
| 2,504,214 | 4/1950 | Miller et al. | 119/155 |
| 3,072,099 | 1/1963 | Stevens | 119/155 |
| 4,145,994 | 3/1979 | Miller | 119/155 |

Primary Examiner—Hugh R. Chamblee
Attorney, Agent, or Firm—Zarley, McKee, Thomte, Voorhees & Sease

[57] ABSTRACT

A first open frame member has a U-shape frame member and a gate pivotally connected thereto with the gate movable between the frame members for sorting animals in either of two directions through the open frame members. A three-way sorting gate is possible by utilizing two of the first frame members with gates in parallel relation. A four-way sorting gate is provided by adding a two-way sorting gate and a five-way sorting gate is provided by combining two three-way sorting gates. In each instance the second frame member has top and bottom elements which pivot to the inner vertical element of the first frame member and the gate has a tube through which the vertical element of the first frame member extends. Each of the gates may be compactly folded for storage and transport.

11 Claims, 14 Drawing Figures

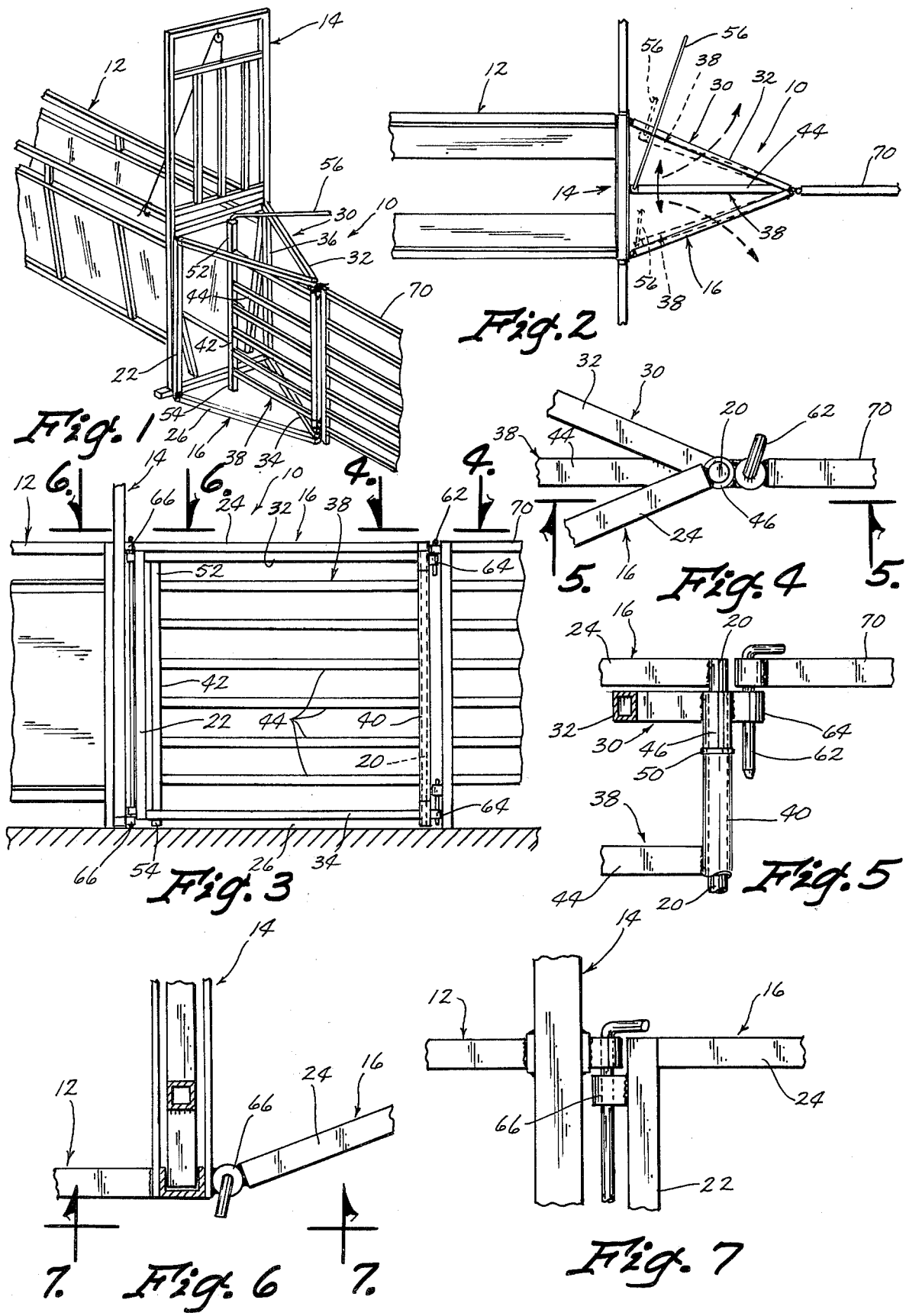

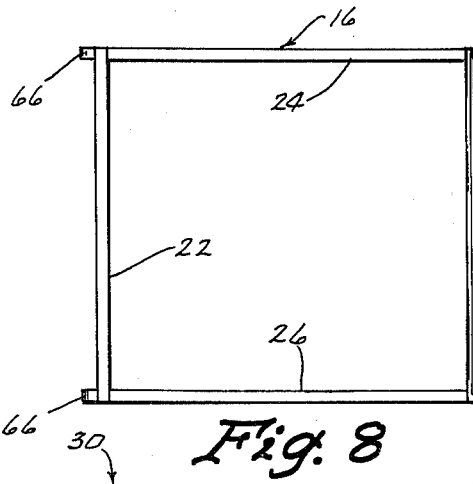
Fig. 8
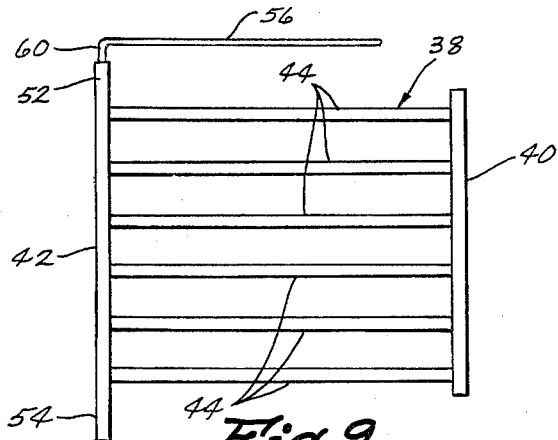
Fig. 9
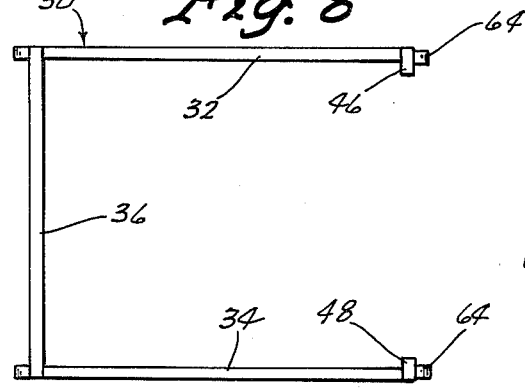
Fig. 10
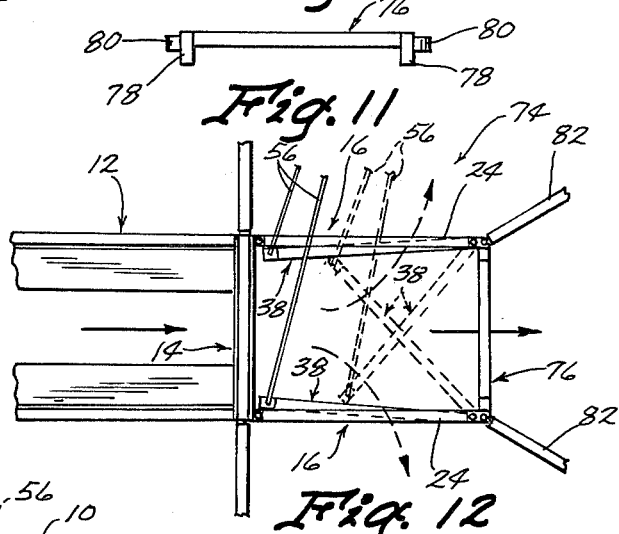
Fig. 11
Fig. 12
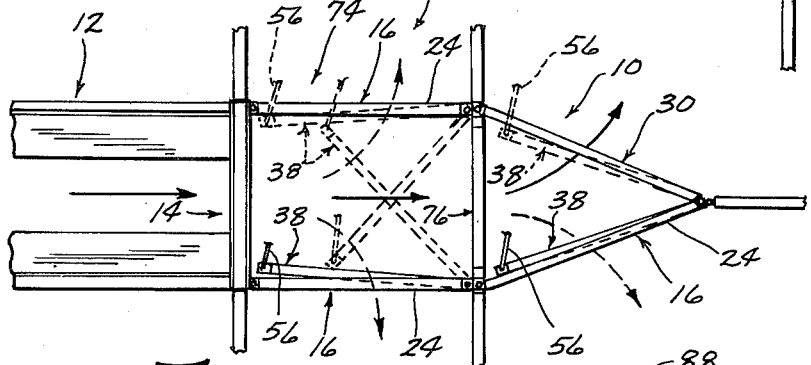
Fig. 13
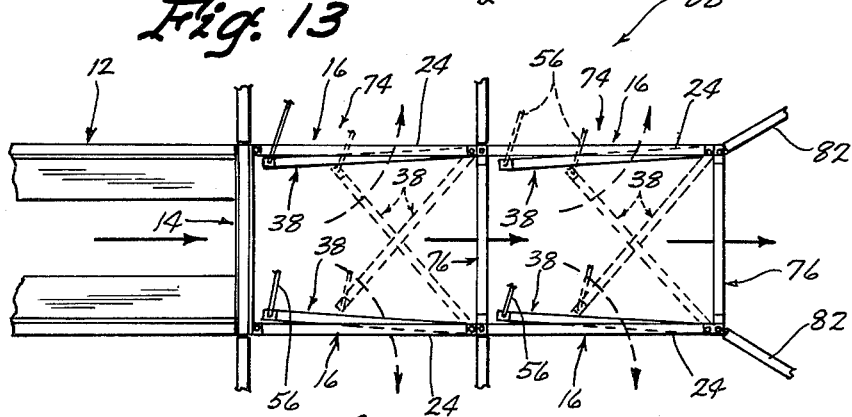
Fig. 14

ANIMAL SORTING GATE

BACKGROUND OF THE INVENTION

The handling of sheep and other farm animals requires moving them between different areas numerous times and thus equipment is needed that is easily moved, assembled and disassembled and capable of being constructed in a variety of different arrangements to accommodate varying needs. For instance it may be desirable to sort the animals into only two lots on one occasion and then on another occasion the animals may be sorted into three, four or even five lots. The sorting gates used should be durable but yet light weight with a minimum of materials required and easily stored in a compact condition. Capability should also be provided for remote operation of the gate in order to not distract the animals.

A maximum number of common part usage is highly desirable in order to minimize the number of different pieces of equipment required to assemble the desired sorting gate.

SUMMARY OF THE INVENTION

A sheep runway may have at its end either a two-way, three-way, four-way or five-way sorting gate. Each of the gates involve combinations of a two-way gate and a three-way gate. The four-way sorting is possible through combining a three-way gate with a two-way gate and a five-way sorting is possible through combining two three-way gates.

Each of the two and three-way gate units include a basic first frame member including top and bottom elements interconnected by inner and outer vertical elements. The gate is pivotally connected to the inner element by the inner element extending through an elongated tube on the inner end of the gate. In the two-way gate unit a second U-shaped open frame has upper and lower frame elements pivotally connected to the inner vertical element of the first frame. The bottom frame element of the second frame rests on the bottom frame element of the first frame and the tube of the gate rests on the bottom frame element of the second frame and the top frame element of the second frame is closely adjacent the top of the gate tube and the top element of the first frame.

The gate includes an outer vertical element which extends above and below the first and second frames to limit pivotal movement to substantially the planes of the first and second frames. When not in use the first and second frames and gate may be compactly pivoted to a collapsed compact condition for storage and travel.

The sorting gates are easily connected and disconnected from enclosure panels by pin and sleeve connections.

DESCRIPTION OF THE DRAWINGS

FIG. 1 is a fragmentary perspective view of a sheep runway and two-way sorting gate.

FIG. 2 is a top plan view thereof.

FIG. 3 is an enlarged side elevational view.

FIG. 4 is a fragmentary top plan view taken along line 4—4 in FIG. 3.

FIG. 5 is a cross-sectional view taken along line 5—5 in FIG. 4.

FIG. 6 is a cross-sectional view taken along line 6—6 in FIG. 3.

FIG. 7 is a cross-sectional view taken along line 7—7 in FIG. 6.

FIG. 8 is an elevational view of the first open frame member.

FIG. 9 is an elevational view of the gate.

FIG. 10 is an elevational view of the second U-shaped frame member.

FIG. 11 is an elevational view of one of the two frame elements used for interconnecting the two first frame members utilized in a three-way sorting gate, as shown in FIG. 12.

FIG. 12 is a top plan view of the three-way sorting gate.

FIG. 13 is a top plan view of a four-way sorting gate arrangement utilizing a three-way and two-way sorting gate in combination.

FIG. 14 is a top plan view of a five-way sorting gate unit utilizing two three-way sorting gates.

DESCRIPTION OF THE PREFERRED EMBODIMENT

The two-way sorting gate of this invention is referred to generally in FIG. 1 by the reference numeral 10 and is shown at the end of a runway 12 having a guilotine gate 14.

Basically the two-way sorting gate 10 includes a first frame member 16 shown alone in FIG. 8 and including inner and outer vertical elements 20 and 22 and top and bottom frame elements 24 and 26, respectively.

A second basic frame member 30 is seen in FIG. 10 and includes top and bottom frame elements 32 and 34 interconnected by an outer vertical frame element 36.

A gate 38 includes an inner tube 40 and an outer tube 42 interconnected by a plurality of horizontal elements 44.

The assembly of the three major components for the two-way gate 10 is shown in FIGS. 4 and 5. The inner vertical frame element 20 of the first frame 16 is a shaft and extends through upper and lower sleeves 46 and 48 on the ends of the top and bottom frame elements 32 and 34, respectively. The tube 40 on the inner end of the gate 38 is sandwiched between the sleeves 46 and 48 and bear against a pair of washers 50. The top and bottom end portions 52 and 54 of the outer vertical element 42 of the gate 38 extend beyond the top and bottom of the frame members 16 and 30 thus abutting thereagainst and limiting pivotal movement therebetween to substantially the planes of the frame members 16 and 30.

The gate 38 may be remotely operated by an operating handle 56 having a downwardly extending end portion 60 received in the open upper end 52 of the outer tubular element 42.

As seen in FIG. 2, by the dash-line arrows, animals may be directed in one of two different directions through the two-way gate. The two-way gate is connected to other fencing through pins 62 (FIG. 3) received in sleeves 64 mounted on the sleeves 46 and 48 of the second frame member 30 and similar sleeves 66 (FIG. 8) are mounted on the outer top and bottom ends of the first frame member and similar sleeves 68 are mounted on the second frame member 30. The pin 62 is shown separate from an enclosure panel 70 but could be an integral part thereof.

The three-way sorting gate 74 is shown in FIG. 12 and includes first open frame members 16 disposed in parallel relationship and interconnected by top and bottom frame elements 76 having sleeves 78 at opposite ends for pivotally engaging the rod 20 at the inner end of the frame member 16. Connecting sleeves 80 at opposite ends connect the three-way gate to enclosure panels 82 in a similar fashion as shown in FIG. 5 relative to the two-way sorting gate 10. It is seen that the individual gates 38 may be pivoted to the dash-line positions through operation of the operating handles 56 to provide the three different passageways as indicated by the three arrows in FIG. 12.

In FIG. 13 a four-way sorting gate 86 is shown as a combination of a three-way sorting gate 74 and a two-way sorting gate 10 thus providing four different passageways as indicated by the arrows.

In FIG. 14 a five-way sorting gate 88 is shown by combining two three-way sorting gates 74 and the five different passageways are indicated by the arrows.

In operation it is thus seen that any given sorting conditions may be easily adapted to by the appropriate selection of either a two-way sorting gate alone, a three-way sorting gate or two three-way sorting gates or a two and a three-way sorting gate in combination. Other possibilities are also obviously possible by further combining of these basic units. Each of the gates are simple in construction, foolproof in operation, and make possible unlimited sorting arrangements.

I claim:

1. An animal sorting gate assembly comprising,
   first and second open frame members pivotally interconnected to pivot about a common vertical axis,
   a gate member positioned to pivot about said common pivotal axis and between each of said first and second frame members, and
   said first frame member including inner and outer vertical elements interconnected by top and bottom elements and said inner element functions as the axis of pivotal movement for said second frame member and said gate which are connected thereto,
   said second frame member including an outer vertical frame element and top and bottom frame elements having their inner ends pivotally connected to said inner frame element of said first frame member,
   said pivot connections for said second frame member being between the connections of said top and bottom elements to said inner vertical element of said first frame member,
   said pivotal connection of said gate including a tube in which said inner element of said first frame member is positioned, said tube extending the substantial length of said inner element of said first frame and said second frame connection including sleeves at the ends of said top and bottom frame elements through which said inner element of said first frame member extends,
   said sleeve on said bottom frame element of said second frame member abuts against the bottom element of said first frame member and said tube on said gate abuts against said sleeve on said bottom element of said second frame member and said sleeve on the top element of said second frame member being closely adjacent and between said tube and said top element of said first frame member whereby said gate is vertically confined between the sleeves of said second frame member and said sleeves of the second frame member are vertically confined between said tube and top and bottom elements of said first frame member, respectively, the top and bottom elements of said first and second frame members being vertically spaced from one another and from said gate for noninterfering pivotal movement of said first and second frame members and gate relative to one another, and
   cooperative stop means being provided between said gate and said first and second frame members to limit pivotal movement to between the planes of said frame members.

2. The structure of claim 1 wherein top and bottom connecting sleeves are provided on the outer ends of said first and second frame members for connecting to spaced apart passageway enclosure means each including top and bottom pins to be received in said connecting sleeves.

3. The structure of claim 1 wherein an operating lever is connected to said gate for remote operation of said gate.

4. The structure of claim 3 wherein said operating lever includes an elongated handle having a downwardly extending end portion pivotally received in an opening in the outer upper end of said gate.

5. The structure of claim 1 wherein said gate is pivotable from first and second positions in the substantial planes of said first and second frame members, respectively.

6. The structure of claim 1 wherein said cooperative stop means includes said gate having an outer vertical element which has top and bottom end portions which extend above and below the top and bottom elements of said first and second frame members thereby adapted to abut thereagainst when said gate is moved towards either of said frame members.

7. The structure of claim 1 wherein said first and second frame members and said gate member are adapted to be pivoted into substantially a common plane for storage of said gate.

8. An animal sorting gate assembly comprising,
   first and second open frame members pivotally interconnected to pivot about a common vertical axis,
   a first gate member positioned to pivot about said common pivotal axis and between each of said first and second frame members,
   said first frame member including inner and outer vertical elements interconnected by top and bottom elements and said inner element functions as the axis of pivotal movement for said second frame member and said gate which are connected thereto,
   a third open frame member being pivotally connected to the opposite end of said second frame members,
   a second gate member being pivotally connected to said third frame member on a vertical axis common to the connection of said second and third frame members,
   said third frame member including inner and outer vertical elements interconnected by top and bottom elements and said inner element functions as the axis of pivotal movement for said second frame member and said second gate which are connected thereto,
   said first and third frame members being of substantially equal length and longer than said second frame member and said first and third frame members being movable to positions in parallel relationship, with said second frame member being perpendicular to each of said first and third frame members, thereby providing three passageways through said gate assembly, one each through each of said three frame members, said outer ends of said first and third frame members including means for connecting said outer ends to spaced apart passageway enclosure means thereby providing an access into said gate assembly from said passageway between said first and third frame members.

9. The structure of claim 8 wherein said first and second gate members are longer than said second frame member and of a length to substantially close said first and third frame members respectively when arranged parallel thereto.

10. The structure of claim 8 wherein fourth and fifth frame members interconnected at their inner ends are connected at their outer ends to the inner and outer ends of said second frame member and a gate is pivotally connected to the inner ends of said fourth and fifth frame members whereby a fourth passageway through said gate assembly is provided.

11. The structure of claim 8 wherein fourth and fifth parallel spaced apart frame members are connected at their outer ends to the inner and outer ends of said second frame member and are interconnected at their inner ends by a sixth frame member and second and third gate members are pivotably connected to the inner ends of said fourth and fifth frame members respectively for pivotable movement between said respective fourth and fifth frame members to said sixth frame member thereby providing a fifth passageway through said gate assembly.

* * * * *